(No Model.)
T. J. BRAY.
MECHANISM FOR THE MANUFACTURE OF PIPE.
No. 382,453. Patented May 8, 1888.
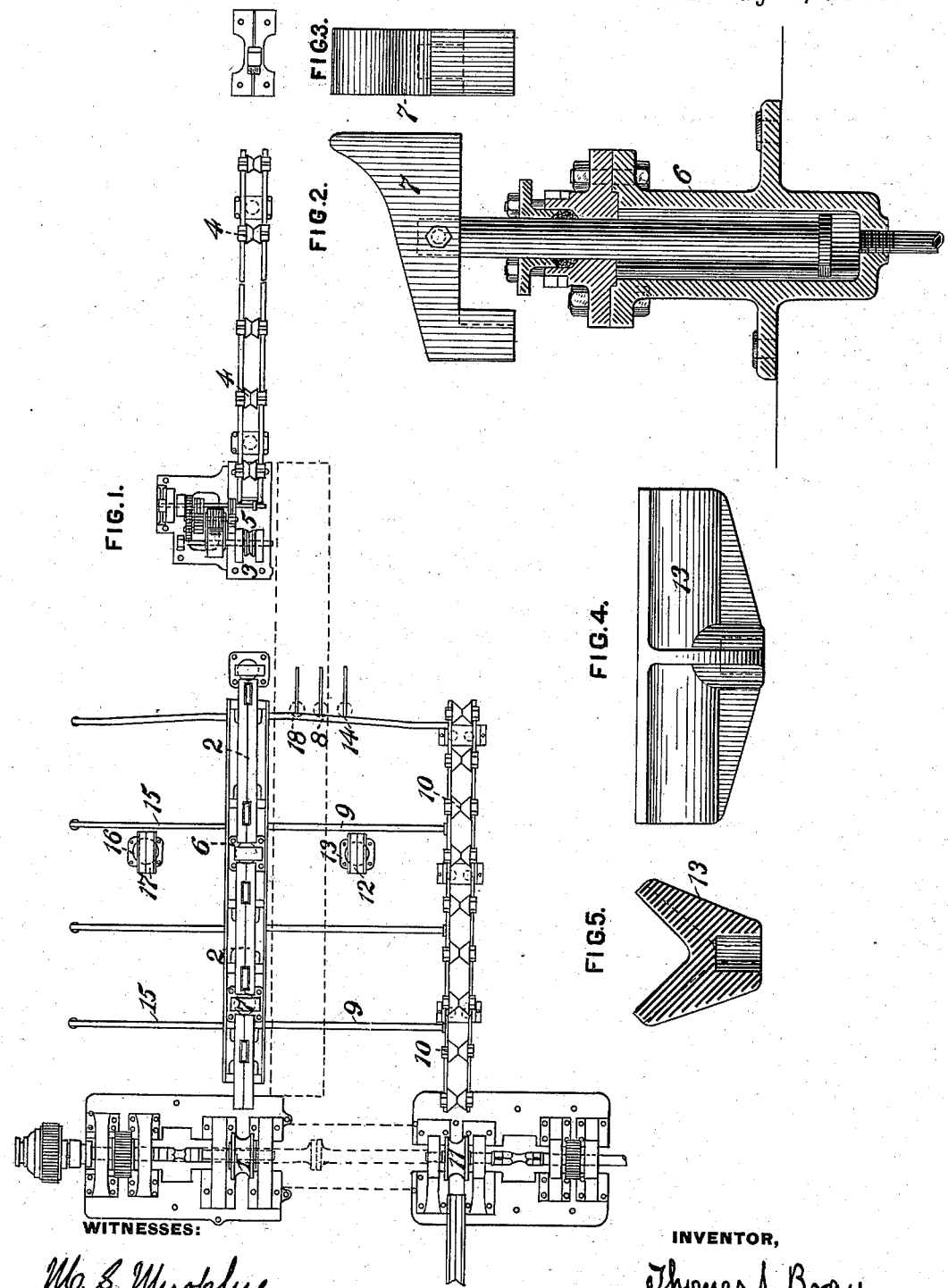
WITNESSES:
Mc. S. Murphy.
F. E. Gaither.
INVENTOR,
Thomas J. Bray.
by Darwin S. Wolcott.
Att'y.
N. PETERS. Photo-Lithographer, Washington, D. C.

UNITED STATES PATENT OFFICE.

THOMAS J. BRAY, OF WHEELING, WEST VIRGINIA, ASSIGNOR OF ONE-HALF TO THE RIVERSIDE IRON WORKS, OF SAME PLACE.

MECHANISM FOR THE MANUFACTURE OF PIPE.

SPECIFICATION forming part of Letters Patent No. 382,453, dated May 8, 1888.

Application filed February 3, 1888. Serial No. 262,907. (No model.)

*To all whom it may concern:*

Be it known that I, THOMAS J. BRAY, a citizen of the United States, residing at Wheeling, in the county of Ohio and State of West Virginia, have invented or discovered a certain new and useful Improvement in Manufacture of Pipe, of which improvement the following is a specification.

In the manufacture of lap-weld pipe the plate or strip of metal from which it is designed to form the pipe is first scarfed along its longitudinal edges and then bent into a skelp. This skelp is then placed in a suitable furnace through a door in its rear end, and when heated to a welding temperature is pushed out into a pair of suitably-grooved rolls located in front of and within convenient proximity to the furnace. In the opening formed by the grooves in the rolls is arranged a ball, over which the pipe is forced by the action of the rolls, said ball being held in position by a long bar or mandrel. After the pipe has passed from between the rolls, the mandrel is withdrawn and the pipe is lifted out of the trough, which is arranged in the line of feed of the rolls, by attendants provided with levers or hooks, the number of attendants necessary for this purpose being dependent upon the size and weight of the pipe. The pipe is then inspected, and if the seam is good it is rolled or carried to the sizing-rolls and fed thereto, thus finishing the pipe, except trimming the ends thereof. If, however, the seam is not full, the pipe is turned end for end and placed to one side, and in due time is again heated and passed through the welding, and then, if good, through the sizing-rolls.

As will be readily understood, the above-recited operations necessitate the employment of a large number of men, the number increasing rapidly with the size and weight of the pipe manufactured.

The object of the invention herein is to provide mechanical and automatically-operating devices for the purpose of facilitating the above-described operations and avoiding the employment of such a large number of operatives or attendants.

In general terms, the invention herein consists in the construction and combination of mechanical devices or elements, all as more fully hereinafter described and claimed.

In the accompanying drawings, forming a part of this specification, Figure 1 is a plan view of a plant or apparatus for welding pipe having my improvements incorporated therewith. Fig. 2 is a sectional elevation of one of the pipe-shifting devices. Fig. 3 is an end elevation thereof, and Figs. 4 and 5 are side and end elevations of the heads of the pipe-reversing devices.

The welding-rolls 1, which are of the usual construction, are arranged in front of a suitable heating-furnace (not shown) and driven in the usual or any suitable manner. In line with the feed of these welding-rolls is arranged a guiding and receiving trough, 2, for the reception of the pipe after the welding operation has been effected. A pair of grooved and reversible rolls, 3, are arranged in front of the trough 2, and a series of friction-rolls, 4, are arranged in line with the rolls 3. Between the grooved rolls 3 and the friction-rolls 4 is located a stop block or head, 5, against which the rear end of the mandrel carrying the welding-ball bears during the welding operation, said mandrel being of such a length that when its rear end is in engagement with the stop-block or head the conical ball carried on the front end of the mandrel will be held in the groove of the welding rolls 1.

In the operation of the devices hereinbefore recited the skelp is forced over the ball, thereby welding the scarfed edges thereof and along the supporting-mandrel. As soon as the pipe has escaped from the welding-rolls the stop-block or head 5 is moved to one side and the rolls 3, through the grooves of which the mandrel passes, are so rotated as to draw the mandrel from the pipe and run it along over the grooved friction-rolls 4. As soon as the mandrel has been withdrawn from the pipe it is removed therefrom, as hereinafter stated, the rolls 3 reversed, and the mandrel—a ball having been placed on its front end—is pushed along the trough 2 until the ball is in proper position. The head-block or stop is then placed in position against the rear end of the mandrel.

In order to facilitate the removal of the pipe from the trough 2, the latter is divided up in three or more sections, as shown, and between these sections is located a fluid-pressure cylinder, 6, provided with a piston carrying a head, 7, the upper edge of said head being inclined, as shown in Fig. 2, in a direction at right angles to the trough 2. As soon as the mandrel has been withdrawn from the pipe, as hereinbefore stated, pressure is admitted into the fluid-pressure cylinders through the medium of the valve mechanism 8, thereby raising the pipe from the trough. As soon as the pipe is clear of the side of the trough it will roll down the inclined faces of the heads 7 onto the bars or skids 9, arranged at right angles to the trough 2 and on a level therewith. The pipe, on being delivered upon the skids, is carefully inspected, and if the seam is found to be full and perfect the pipe is rolled along the skids onto the grooved friction-rollers 10, located at the opposite ends of the skids. The pipe is then pushed along the rollers into the grooved rolls 11, by which the pipe is reduced to the desired external diameter and finished, except as regards the trimming of the ends. In case, however, the seam is found defective, the pipe is rolled to a point on the skids above a fluid-pressure cylinder, 12, provided with a piston carrying a V-shaped head, 13, said head being so mounted on the piston as to freely rotate thereon. When the imperfect pipe has been rolled into line with the cylinder 12, pressure is admitted thereto by the valve mechanism 14, thereby lifting the pipe from the skids. The cylinder is so located as to engage the pipe at or about the middle thereof, and as soon as the pipe is clear of the skids it is turned end for end, the piston serving as a pivot therefor, and is lowered down onto the skids, so as to lie at an acute angle to the trough 2, across which it is then rolled onto the skids 15, arranged on the opposite side of the trough 2. The pipe is then passed to the rear of the heating-furnace, placed therein, and when sufficiently heated is again passed through the welding and finishing operations. As the end which enters the welding-rolls first is ragged and imperfect, it is necessary to turn the pipe end for end, as above described, in order to present a good end to the rolls in the second welding operation, hereinbefore mentioned.

In manufacturing some kinds of pipe it is necessary to subject all the pipe to the welding operation twice, in which case the position of the heads 7 is reversed, so as to roll the pipes from the first run onto the skids 15. In order to turn these first-run pipes end for end, a fluid-pressure cylinder, 16, provided with a piston carrying a head, 17, is located midway of the skids 15 and operated by a valve mechanism, 18, said parts being similar in construction and operation to the reversing mechanism employed in connection with the skids 9. After being rolled onto the skids 15 the pipes are turned, as hereinbefore described, and rolled to one side until all of the first runs have been operated on. The pipes are then passed to the rear of the furnace and charged thereinto, and when sufficiently heated are again passed through the welding-rolls. While operating on these second runs the heads 7 are arranged so as to roll the pipes onto the skids 9, from which, if perfect, they are rolled onto the grooved rollers 10, and thence between the sizing and finishing rolls 11.

It will be observed that by using the herein-described mechanisms for shifting and reversing the pipes, said mechanisms being in some respects automatic in their action, the pipe can be easily and quickly shifted from one part of the apparatus to the other and adjusted for subsequent operations.

Other mechanical devices, which will readily suggest themselves to the skilled mechanic, may be employed in lieu of the fluid-pressure mechanisms for raising and lowering the pipe shifting and reversing heads.

I claim herein as my invention—

1. In a plant for the manufacture of pipe, a welding mechanism, in combination with a receiving-trough and a vertically-movable head for raising and discharging the pipe from the trough, substantially as set forth.

2. In a plant for the manufacture of pipe, a welding mechanism, in combination with a receiving-trough, skids located at one side of said trough, and a vertically-movable head for raising the pipe from the skids and reversing its position, substantially as set forth.

3. In a plant for the manufacture of pipe, a welding mechanism, in combination with a receiving-trough, skids located at one side of said trough, a vertically-movable head for raising the pipe from the trough and discharging it upon the skids, and a vertically and horizontally movable head for reversing the position of the pipe, substantially as set forth.

4. In a plant for the manufacture of pipe, a welding mechanism, a sectional receiving-trough, and fluid-pressure mechanisms located between the sections of the trough and provided with heads having their upper faces inclined, substantially as set forth.

In testimony whereof I have hereunto set my hand.

THOMAS J. BRAY.

Witnesses:
DARWIN S. WOLCOTT,
R. H. WHITTLESEY.